United States Patent Office 3,280,181
Patented Oct. 18, 1966

3,280,181
PROCESS FOR THE OXIDATION IN LIQUID PHASE OF ALKYL - SUBSTITUTED AROMATIC COMPOUNDS
Luigi Notarbartolo, deceased, late of Milan, Italy, by Enza Pascalino Notarbartolo, administratrix, and Paola Notarbartolo, heir, Milan, and Werner Muench and Vincenzo Ruoti, Cesano Maderno, Italy, assignors to Snia Viscosa Società Nazionale Industria Applicazioni Viscosa S.p.A., Milan, Italy, a company of Italy
No Drawing. Filed Dec. 30, 1963, Ser. No. 335,712
Claims priority, application Italy, July 1, 1960, Patent 631,864
4 Claims. (Cl. 260—524)

The present application is a continuation-in -part of application Serial No. 115,290, filed June 7, 1961, now abandoned. The present invention relates to the oxidation in liquid phase of aromatic hydrocarbons carrying one or more aliphatic side chains, such as toluene and xylene.

According to the starting compounds, and in particular to the constitution of the aliphatic chains, there are obtained, through the oxidation of one or more of said chains, acids such as benzoic acid, toluic acid, phthalic acid, etc., or ketones, such as acetophenone (which is obtained from ethyl benzene or from cumene).

It is known that the oxidation of such starting compounds may be effected with oxygen or molecular oxygen containing gases, in liquid phase, using as catalysts compounds of cobalt, which are soluble in the hydrocarbon to be oxidized (see for instance K. J. H. van Sluis, Chem. Produ., 1957, pages 191–192), such as cobalt naphthenate or solutions of cobalt acetate in acetic acid (see for instance U.S.A. Patent No. 2,673,217). In those cases, the catalysts are in solution from the beginning to the end of the reaction.

One disadvantage of prior practice is that the catalysts are soluble, and cannot be recovered without further treatment of the solution. This is time-consuming, oftentimes difficult, and always adds to the costs of the process.

One object of the present invention is to provide a process for the oxidation in liquid phase of aromatic hydrocarbons, such as toluene and xylene, where the catalyst is insoluble both in the starting material and in the reaction product.

Another object of the invention is to provide a process for the oxidation in liquid phase of aromatic hydrocarbons, such as toluene and xylene, in the presence of a catalyst, where the catalyst can be recovered readily by filtration after the reaction is completed.

Another object of the invention is to provide a process for the oxidation in liquid phase of hydrocarbons of the character described, where the catalyst can be used over and over again.

Another object of the present invention is to provide a process for the oxidation of said hydrocarbons in liquid phase with oxygen or molecular oxygen containing gases, in the presence of a catalyst that is a cobalt compound which remains insoluble from the beginning to the end of the process.

The expression "insoluble catalyst" should be understood to mean that the major part of the catalyst is not dissolved, but not to exclude a small portion thereof being dissolved, as will be better explained hereinafter.

The catalyst employed is a cobalt oxide having a greater oxygen content than CoO. The catalyst may be a cobalt oxide corresponding more or less to the formula $Co_2O_3$, or to a water-free mixture of $Co_2O_3$ and $Co_3O_4$. Thus it may be the product obtained by pre-oxidizing a cobalt hydroxide. The term "pre-oxidation" is intended herein to mean the treatment of the cobalt hydroxide in suspension in a non-oxidizable liquid, preferably in aqueous suspension, with oxygen or molecular oxygen containing gases, preferably air, wherein the ordinary cobalt oxide or hydrate is transformed into a modification, the chemical structure whereof remains uncertain but whose oxygen content is greater than that of CoO.

The appearance of the catalyst varies according to the pre-oxidation temperature. The pre-oxidation can be carried out between about 50° and 300° C., but preferably above 100° C., for instance at 150–170° C. If the operation is conducted at these temperatures and the pre-oxidation is carried to completion, namely until no more oxygen is absorbed, the product obtained shows an increase of the oxygen content by about nine grams of oxygen per gram-mole of cobalt hydroxide, and is transformed according to the indications of the literature (Huettig and Kassler, C. 1930 I, 1450/51; Zeitschrift Anorg. Chem. 184 279/88; Natta and Strada, C. 1929 I, 370; Natta and Passerini, C. 1929 II, 381/82) into the hydrate of a cobalt oxide, with a higher oxygen content than corresponds to the formula CoO, and can be separated from the suspension in the shape of a fine powder which is dark, and may be black, substantially insoluble in toluene, xylene or analogous organic solvents, and is easily filtrable. At lower temperature, below 100° C., for instance around 70° C., there is obtained a dense brown paste, containing the catalyst and difficult to filter and showing a low but noticeable solubility in said solvents. All these products, however, provide good catalysts according to the invention.

The duration of the pre-oxidation depends on the temperature at which it is carried out. So at ordinary pressure at 70° C. in aqueous suspension it lasts 12 hours, while at 160° C., in aqueous suspension, in the autoclave, it lasts about one hour. Generally the duration varies between 10 minutes and 24 hours.

The use of the aforesaid catalyst affords considerable advantages over those previously known. In particular, being insoluble, need of its recovery from the solution is avoided; it suffices to hot-filter the product obtained, at the end of the oxidation, to get as filtrate a solution containing the acid (or the ketone) obtained by the oxidation, and a filter cake containing the catalyst. Thus, the catalyst may remain substantially unchanged in the reactor, and fit to catalyze the reaction continuously for weeks and even for months. In fact, numerous investigations have shown that the end product contains only traces of dissolved cobalt, and that, using the same catalyst again and again, these traces decrease, so that finally the end-product becomes practically cobalt-free, even though there be several kilograms of the catalyst in the reactor. So far as known, the oxidation reaction described is the first of its nature to be carried out with the aid of a catalyst that is insoluble both in the starting material and in the reaction product. Moreover, the catalyst according to the invention produces a more rapid start of the oxidation reaction as compared with known catalysts.

The preparation of the catalyst is conveniently effected by precipitating the cobalt hydroxide preferably from its chloride or other salt, such as sulfate, nitrate, etc. In that case the pre-oxidation can be effected even in the water of precipitation and the hydroxide can be washed after the preoxidation, being much more easily filtered and washed, at that time, and it is the more easily washed the higher has been the temperature of pre-oxidation.

The regeneration of the exhausted catalyst can be effected by re-dissolving the catalyst, after the filtration of the reaction product, in an acid, for instance hydrochloric acid, and re-precipitating it with alkalies, namely repeating the operation of preparation. It can however be effected much more simply by washing the catalyst with an organic solvent wherein said catalyst is insoluble, preferably toluene or xylene, eliminating the solvent in a current of steam and finally re-suspending in water the catalyst which then is subjected again to pre-oxidation, after addition of fresh cobalt hydroxide also previously pre-oxidized.

The oxidation of the hydrocarbon itself, containing the catalyst in suspension, is effected by bubbling oxygen or molecular oxygen containing gases, preferably air, through the hydrocarbon, under conditions already known in the art for this type of reaction. For instance, in the oxidation of toluene, the operation is carried out at temperatures comprised between 120° and 200° C. by feeding the hydrocarbon (toluene or xylene) and air continuously into the reactor and at the pressure necessary to keep the hydrocarbon liquid, with the catalyst in the reactor, and then filtering or decanting the oxidation product which is practically free of cobalt. The catalyst, as stated, remains substantially unchanged in the reactor. The reaction takes place, in effect, with the aid of gaseous oxygen on the surface of a solid catalyst which is suspended in a liquid medium. The oxidation lasts from 2 to 16 hours according to the speed of passage of the oxygen and to the concentration of benzoic acid to be obtained. It is understood that if the oxidation is carried out with air in the manner described, the air having lost the major part of its oxygen content is removed continuously from the reactor together with the water formed during the reaction.

The molar ratio between the preoxidized insoluble cobalt oxide catalyst calculated as cobalt metal, and the hydrocarbon to be oxidized is from 1:60 to 1:100, and preferably is between 1:70 and 1:90. The oxidation can be effected at temperatures between 120° C. and 200° C., preferably at temperatures between 130° C. and 180° C., and at pressures between 1.5 and 10 atmospheres.

The invention will be better understood from the following working examples which are not limiting.

*Example 1*

119 g.=½ mole of $CoCl_2.6H_2O$ are dissolved in 1500 cc. of $H_2O$ and made to precipitate with 90 g. of 50% NaOH at room temperature. The suspension is charged into a flask equipped with a reflux cooler, and into it is introduced at 70°–80° C. a strong current of finely divided air, for a period of about 10 hours.

The suspension changes its color from pink to dark brown. The suspension is filtered, is washed with water to eliminate the alkali used for precipitation and, while it is still moist, an amount equal to 20 g. of metallic cobalt is taken out, to be used as a catalyst for oxidation.

This amount of cobalt oxide catalyst is suspended in 3.55 litres=3100 g. of toluene; and the suspension so obtained is discharged into an autoclave of stainless steel, of 7 litres capacity. Then the autoclave is closed and heated up to 135° C. while simultaneously air is passed into the autoclave at the speed of 300 litres/hour while maintaining a pressure of 1.8 atm. The oxidation starts immediately. The oxygen content in the effluent gases drops down to about 2%; and the reaction may be interrupted after about 7 hours, when the benzoic acid content of the reaction product attains the value of about 38.7% by weight.

The autoclave is vented; the product is discharged, and filtered while still hot. The insoluble catalyst is collected on the filter, while from the filtrate by means of cooling the major part of the benzoic acid is allowed to crystallize. The remainder, corresponding to the solubility of benzoic acid in toluene at the temperature of crystallization (about 3% at +5° C.), is recovered by evaporation of the toluene.

A total amount of 1325 g. of acid is obtained. The catalyst is washed first with toluene to remove the resins absorbed thereby. Then the toluene is removed by boiling the catalyst with water and distilling off the water-toluene azeotrope formed. The catalyst suspended in water is again pre-oxidized at ordinary pressure with air, in order that the catalyst may be re-employed again.

The yield of benzoic acid, calculated on the toluene consumed, taking into account the toluene carried away by the gas of oxidation and the toluene recovered, =2000 g. total, is 95.4% by weight; the yield calculated on the oxygen consumed is 80%.

*Example 2*

119 g.=½ mole of $CoCl_2.6H_2O$ are dissolved in 600 ml. of $H_2O$ and are made to precipitate with 180 g. of 20% NaOH at room temperature under stirring.

The suspension is then charged into a stainless steel autoclave, which is then closed, then air is charged up to a pressure of 45 atms. and heating is effected up to 170° C., while the pressure of the autoclave rises up to 68 atm. After two hours at that temperature, the autoclave is allowed to cool down. The pressure diminishes to 38 atm. showing with respect to the initial value a diminution of 7 atm., corresponding to the oxygen absorbed by the catalyst, equal to 4.6 grams of oxygen.

The mass discharged, of dark brown color, is filtered, is washed until disappearance of the alkaline reaction, and is suspended again in 3.550 litres=3100 g. of toluene, which are charged into a stainless steel autoclave of 7 litres capacity. The autoclave is closed and heated to 148°–150° C., while passing air at a speed of 600 litres/hour, keeping an operating pressure of 4.5 atm.

The oxidation starts immediately. The oxygen content in the outlet gas drops down to about 2%; and the reaction can be interrupted after about 4 hours, when the benzoic acid content of the reaction product attains the value of about 35%. Venting is carried out as in Example 1. A total amount of 1180 g. of benzoic acid is obtained, with a yield of 93% with respect to the toluene consumed and of 77.5% with respect to the oxygen consumed.

The recovery of the catalyst is effected as in Example 1; and the catalyst may be reoxidized again for further use, the preoxidation taking place in this case at 170° C. under air pressure.

*Example 3*

An amount of catalyst corresponding to 30 g. of metallic cobalt, and prepared as in Example 2, is suspended finely in 5 litres of toluene and is charged into a stainless steel autoclave of 7 litres capacity.

Then the autoclave is closed and heated up to 178°–180° C., while air, diluted with nitrogen to obtain a 10% $O_2$ content, is passed into the autoclave at the speed of 600 litres/hour, while the pressure is maintained at 9 atm.

The oxidation starts immediately, the oxygen content in the effluent gas drops down to zero, indicating a complete absorption of the oxygen fed. The reaction can be interrupted after about 9 hours, the concentration of benzoic acid being about 81% at that time. The autoclave is vented, the product is discharged, filtered while still hot, and then the operation is carried out as in Example 1.

1460 g. of benzoic acid are obtained corresponding, in this case, to a yield of 94.5% with respect to the toluene and with respect to the $O_2$ consumed, of about 65%.

*Example 4*

An amount of catalyst corresponding to 30 g. of metallic cobalt and prepared as in Example 2, is suspended finely in 5 litres of paraxylene and charged into a stainless steel autoclave of 7 litres capacity.

The autoclave is then closed and heated up to 148–150° C., while passing air at the speed of 400 litres/hour, and maintaining an operating pressure of 4.5 atm. The oxidation starts immediately. The $O_2$ content of the effluent gas drops down to 4%; and the reaction can be interrupted after about eleven hours and fifteen minutes. The autoclave is then vented, the product is discharged and filtered while still hot and 2,600 g. of product of oxidation are allowed to crystallize. It contains 90% of para-toluic acid and 10% of terephthalic acid. The catalyst, that remains on the filter, is regenerated as in Examples 1 and 2.

Having thus described our invention, what we claim is:

1. A process for the catalytic oxidation to the corresponding carboxylic acid of an aromatic hydrocarbon, selected from the group consisting of toluene and xylene, which comprises
    (a) treating the hydrocarbon in the liquid phase with an oxidizing agent selected from the group consisting of oxygen and air, and
    (b) in the presence of a catalyst which is an oxide and which is insoluble both in the hydrocarbon and in the reaction product,
    (c) the reaction being effected at temperatures between 130° C. and 180° C., and at pressures between 1.5 and 10 atmospheres,
    (d) the catalyst being an insoluble, solid cobalt oxide having an oxygen content greater than CoO, and
    (e) separating the liquid oxidized product from the insoluble catalyst by filtration.

2. A process according to claim 1 in which
    (a) an amount of catalyst equivalent to 20 g. of metallic cobalt is suspended in 3100 g. of hydrocarbon,
    (b) the reaction is effected at 148° to 150°, and
    (c) the oxidizing agent is air and is passed at a speed of 600 litres/hour through the hydrocarbon and catalyst,
    (d) while maintaining the pressure at 4.5 atmospheres.

3. A process according to claim 1 in which
    (a) an amount of catalyst equivalent to 20 g. of metallic cobalt is suspended in 5 litres of paraxylene,
    (b) the reaction is effected at 148° to 150°, and
    (c) the oxidizing agent is air and is passed at a speed of 400 litres/hour through the hydrocarbon and catalyst
    (d) while maintaining the pressure at 4.5 atmospheres.

4. A process for the catalytic oxidation to the corresponding carboxylic acids of an aromatic hydrocarbon selected from the group consisting of toluene and xylene, which comprises
    (a) producing a solid catalyst insoluble in said acids by precipitating cobalt hydroxide from its chloride, nitrate, or other salt with an alkali,
    (b) introducing air,
    (c) filtering and washing to eliminate the alkali and to provide a solid over-oxidized cobalt oxide catalyst, and
    (d) treating the hydrocarbon in the liquid phase with an oxidizing agent selected from the group consisting of oxygen and air, and
    (e) causing the reaction to take place at the surface of the solid cobalt oxide at a temperature between 130° C. and 180° C. and at pressures between 1.5 and 10 atmospheres, and
    (f) separating the liquid oxidized product from the insoluble catalyst by filtration.

References Cited by the Examiner

UNITED STATES PATENTS

| | | | |
|---|---|---|---|
| 1,815,985 | 7/1931 | Pansegrau | 260—524 |
| 1,937,689 | 12/1933 | Frazer | 252—472 |
| 1,952,911 | 3/1934 | DeRawal | 252—413 |
| 2,005,774 | 6/1935 | Demant | 260—524 |
| 2,102,341 | 12/1939 | Von Fuchs | 252—414 |
| 2,380,731 | 7/1945 | Drake | 252—413 |
| 2,552,267 | 5/1951 | Emerson et al. | 260—524 |
| 2,602,070 | 7/1952 | Kirkpatrick | 252—472 |
| 2,749,363 | 6/1956 | Williamson et al. | 260—524 X |
| 2,973,326 | 2/1961 | Hodgins et al. | 252—414 X |

OTHER REFERENCES

"Amberlite Ion Exchange," Rohm and Haas Co., (1953), p. 10.

Bergman et al.: Catalysis, pages 955 and 996 (1940).

LORRAINE A. WEINBERGER, *Primary Examiner.*

M. S. JAROSZ, S. B. WILLIAMS, *Assistant Examiners.*